(12) United States Patent
Silvestrini et al.

(10) Patent No.: US 10,612,610 B2
(45) Date of Patent: Apr. 7, 2020

(54) BISTABLE BRAKE

(71) Applicant: WARNER ELECTRIC TECHNOLOGY LLC, Braintree, MA (US)

(72) Inventors: Richard Larry Silvestrini, Rockton, IL (US); Stephen E. Nyquist, Simsbury, CT (US); Bradley Lyn Uffelman, Caro, MI (US)

(73) Assignee: Warner Electric Technology LLC, Braintree, MA (US)

( * ) Notice: Subject to any disclaimer, the term of this patent is extended or adjusted under 35 U.S.C. 154(b) by 104 days.

(21) Appl. No.: 15/951,712

(22) Filed: Apr. 12, 2018

(65) Prior Publication Data

US 2019/0316642 A1 Oct. 17, 2019

(51) Int. Cl.
*F16D 63/00* (2006.01)
*F16D 55/30* (2006.01)
(Continued)

(52) U.S. Cl.
CPC .......... *F16D 63/002* (2013.01); *F16D 55/30* (2013.01); *F16D 65/18* (2013.01);
(Continued)

(58) Field of Classification Search
CPC ........ F16D 63/002; F16D 55/30; F16D 65/18; F16D 2121/18; F16D 2121/20; F16D 2121/22; F16D 66/00; F16D 66/003; F16D 66/005; F16D 27/06; F16D 59/02; F16D 2055/0058; F16D 55/28; F16D 2129/065; F16D 2121/14; F16D 2200/0021; F16D 2200/0052
(Continued)

(56) References Cited

U.S. PATENT DOCUMENTS 3,730,317 A 5/1973 Jaeschke
3,741,353 A 6/1973 McKinlety et al.
(Continued)

OTHER PUBLICATIONS

International Search Report issued in corresponding International (PCT) Patent Application No. PCT/US2018/061780 (dated Mar. 27, 2019).
(Continued)

*Primary Examiner* — Pamela Rodriguez
(74) *Attorney, Agent, or Firm* — Reising Ethington P.C.

(57) ABSTRACT

An electromagnetic brake is provided in which short duration current pulses move the brake between engaged and disengaged states. A first current pulse having a first polarity is delivered to a conductor within a field shell when the brake is engaged and establishes an electromagnetic circuit including the field shell and an armature plate that urges the armature plate away from a rotating friction plate and towards the field shell to disengage the brake. A magnetic circuit is maintained after termination of the first current pulse due to a remanence in at least one of the armature plate and the field shell. A second current pulse having a second polarity opposite the first polarity delivered to the conductor when the brake is disengaged weakens the magnetic circuit thereby allowing a spring to move the armature plate away from the field shell and towards the friction plate to engage the brake.

15 Claims, 2 Drawing Sheets

(51) Int. Cl.
*F16D 65/18* (2006.01)
*F16D 121/14* (2012.01)
*F16D 121/22* (2012.01)

(52) U.S. Cl.
CPC ...... *F16D 2121/14* (2013.01); *F16D 2121/22* (2013.01); *F16D 2200/0021* (2013.01); *F16D 2200/0052* (2013.01)

(58) Field of Classification Search
USPC .................. 188/171, 161, 163, 164, 173
See application file for complete search history.

(56) References Cited

U.S. PATENT DOCUMENTS

| | | |
|---|---|---|
| 5,185,542 A | 2/1993 | Lazorchak |
| 9,903,429 B2 * | 2/2018 | Uffelman ................ F16D 65/18 |
| 2006/0169550 A1 | 8/2006 | Albrecht |
| 2015/0152930 A1 | 6/2015 | Uffelman |

OTHER PUBLICATIONS

Written Opinion issued in corresponding International (PCT) Patent Application No. PCT/US2018/061780 (dated Mar. 27, 2019).

* cited by examiner

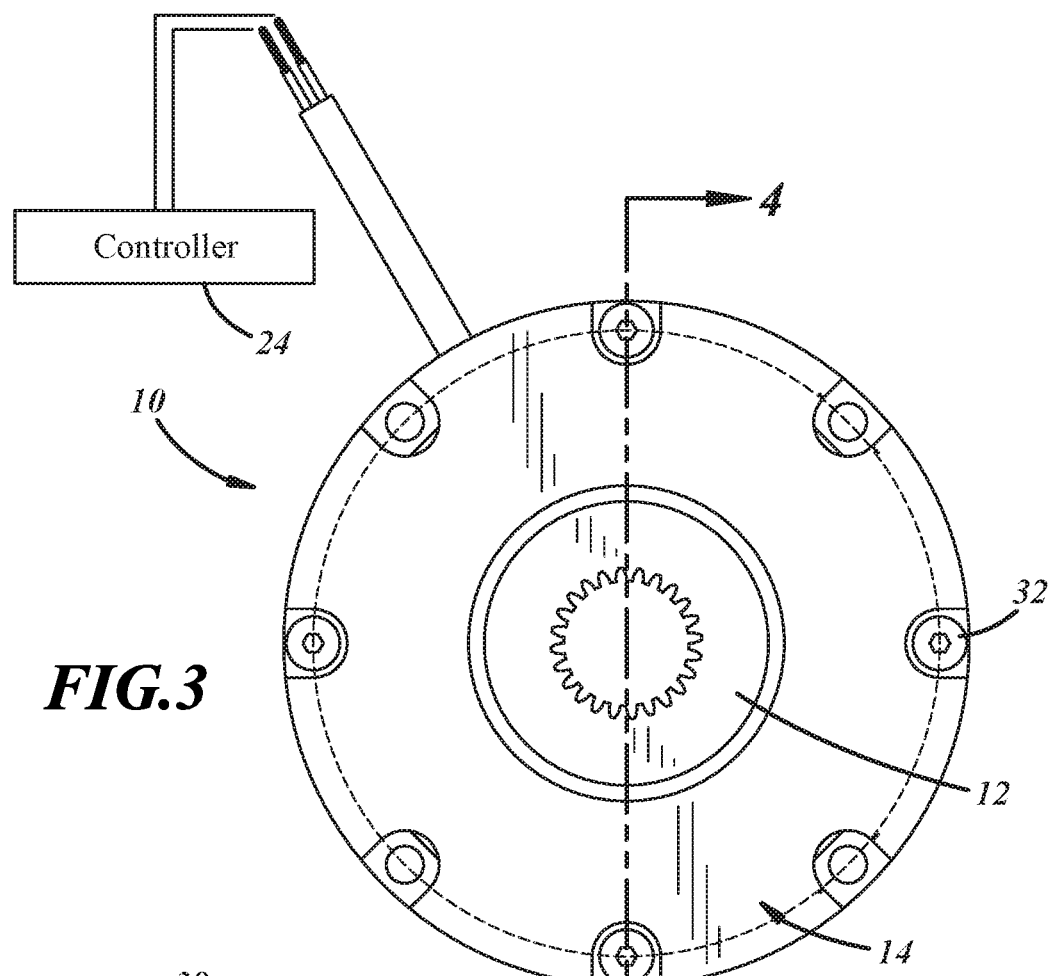
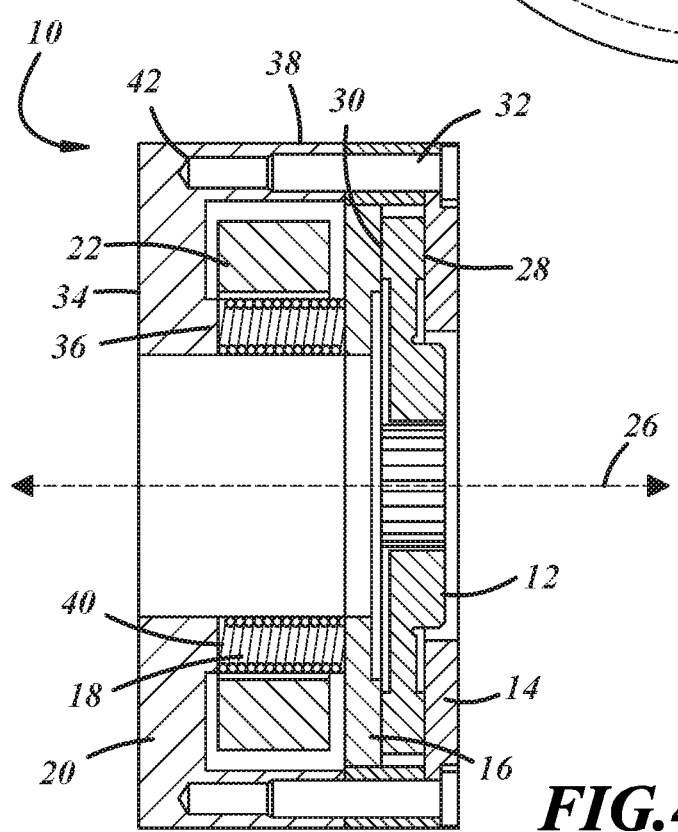
FIG.3
FIG.4

BISTABLE BRAKE

BACKGROUND OF THE INVENTION a. Field of the Invention

This disclosure relates to a brake. In particular, the instant disclosure relates to a bistable brake in which short duration current pulses are used to move the brake between engaged and disengaged states.

b. Background Art

One conventional type of brake used in industrial applications includes a friction plate or disc that is coupled to a rotating member. Springs bias a non-rotating armature plate into engagement with the friction plate in order to engage the brake. An electromagnet and/or magnets are then used to create an electromagnetic or magnetic circuit to draw the armature plate away from the friction plate when it is desired to disengage the brake.

The above-described brakes work well for their intended purpose. The brakes have drawbacks, however. Brakes incorporating permanent magnets are relatively expensive and complex because of the use of permanent magnets and because an electromagnet is still required to break the magnetic circuit formed by the magnets and allow reengagement of the brake. Brakes incorporating electromagnets alone typically require a constant supply of current to maintain the brake in the disengaged stated thereby consuming relatively large amounts of power and generating relatively large amounts of heat.

The inventor herein has recognized a need for a brake that will minimize and/or eliminate one or more of the above-identified deficiencies.

BRIEF SUMMARY OF THE INVENTION

A brake is provided. In particular, the a bistable brake is provided in which short duration current pulses are used to move the brake between engaged and disengaged states.

A brake in accordance with one embodiment of the invention includes a friction plate configured for coupling to a shaft for rotation with the shaft about an axis of rotation. The brake further includes a pressure plate disposed about the axis on a first side of the friction plate and fixed against rotation. The brake further includes an armature plate disposed about the axis on a second side of the friction plate. The brake further includes a field shell disposed about the axis on an opposite side of the armature plate relative to the friction plate. The brake further includes a spring biasing the armature plate in a first axial direction towards the friction plate and away from the field shell to engage the brake. The brake further includes a conductor disposed within the field shell. Delivery of a first current pulse having a first polarity to the conductor when the brake is engaged establishes an electromagnetic circuit including the armature plate and the field shell. The electromagnetic circuit urges the armature plate in a second axial direction away from the friction plate and towards the field shell to disengage the brake. A magnetic circuit including the armature plate and the field shell is maintained after termination of the first current pulse due to a remanence in at least one of the armature plate and the field shell. The magnetic circuit generates an attractive force greater than a biasing force of the spring. Delivery of a second current pulse having a second polarity opposite the first polarity to the conductor when the brake is disengaged weakens the magnetic circuit thereby allowing the spring to move the armature plate in the first axial direction away from the field shell and towards the friction plate to engage the brake.

A brake in accordance with another embodiment of the invention includes a friction plate configured for coupling to a shaft for rotation with the shaft about an axis of rotation. The brake further includes a pressure plate disposed about the axis on a first side of the friction plate and fixed against rotation. The brake further includes an armature plate disposed about the axis on a second side of the friction plate. The brake further includes a field shell disposed about the axis on an opposite side of the armature plate relative to the friction plate. The brake further includes a spring biasing the armature plate in a first axial direction towards the friction plate and away from the field shell to engage the brake. The brake further includes a conductor disposed within the field shell. The brake further includes a controller configured to deliver a first current pulse to the conductor when disengaging the brake. The first current pulse has a first polarity and is configured to establish an electromagnetic circuit including the armature plate and the field shell that urges the armature plate in a second axial direction away from the friction plate and towards the field shell. A magnetic circuit including the armature plate and the field shell is maintained after termination of the first current pulse due to a remanence in at least one of the armature plate and the field shell. The magnetic circuit generates an attractive force greater than a biasing force of the spring. The controller is further configured to deliver a second current pulse to the conductor when engaging the brake. The second current pulse has a second polarity opposite the first polarity and is configured to weaken the magnetic circuit thereby allowing the spring to move the armature plate in the first axial direction away from the field shell and towards the friction plate.

A brake in accordance with another embodiment of the invention includes a friction plate configured for coupling to a shaft for rotation with the shaft about an axis of rotation. The brake further includes a pressure plate disposed about the axis on a first side of the friction plate and fixed against rotation. The brake further includes an armature plate disposed about the axis on a second side of the friction plate. The brake further includes a field shell disposed about the axis on an opposite side of the armature plate relative to the friction plate. The brake further includes a spring biasing the armature plate in a first axial direction towards the friction plate and away from the field shell to engage the brake. The brake further includes a conductor disposed within the field shell. At least one of the armature plate and the field shell has a remanence that generates, after the brake is disengaged by providing a current pulse to the conductor and following termination of the current pulse, an attractive force between the armature plate and the field shell greater than a biasing force of the spring.

A brake in accordance with the present teachings is advantageous relative to conventional brakes. In particular, the inventive brake provides a bistable brake in which the brake may remain in engaged and disengaged states without a continuous current supply thereby limiting power consumption and heat. Further, the brake avoids the use of permanent magnets thereby reducing the cost and complexity of the brake.

The foregoing and other aspects, features, details, utilities, and advantages of the invention will be apparent from reading the following detailed description and claims, and from reviewing the accompanying drawings illustrating features of this invention by way of example.

BRIEF DESCRIPTION OF THE DRAWINGS

FIG. 3 is a front view of the brake of FIG. 1.
FIG. 4 is a cross-sectional view of the brake of FIGS. 1-3 taken along lines A-A in FIG. 3.

DETAILED DESCRIPTION OF THE INVENTION

Figure 1:
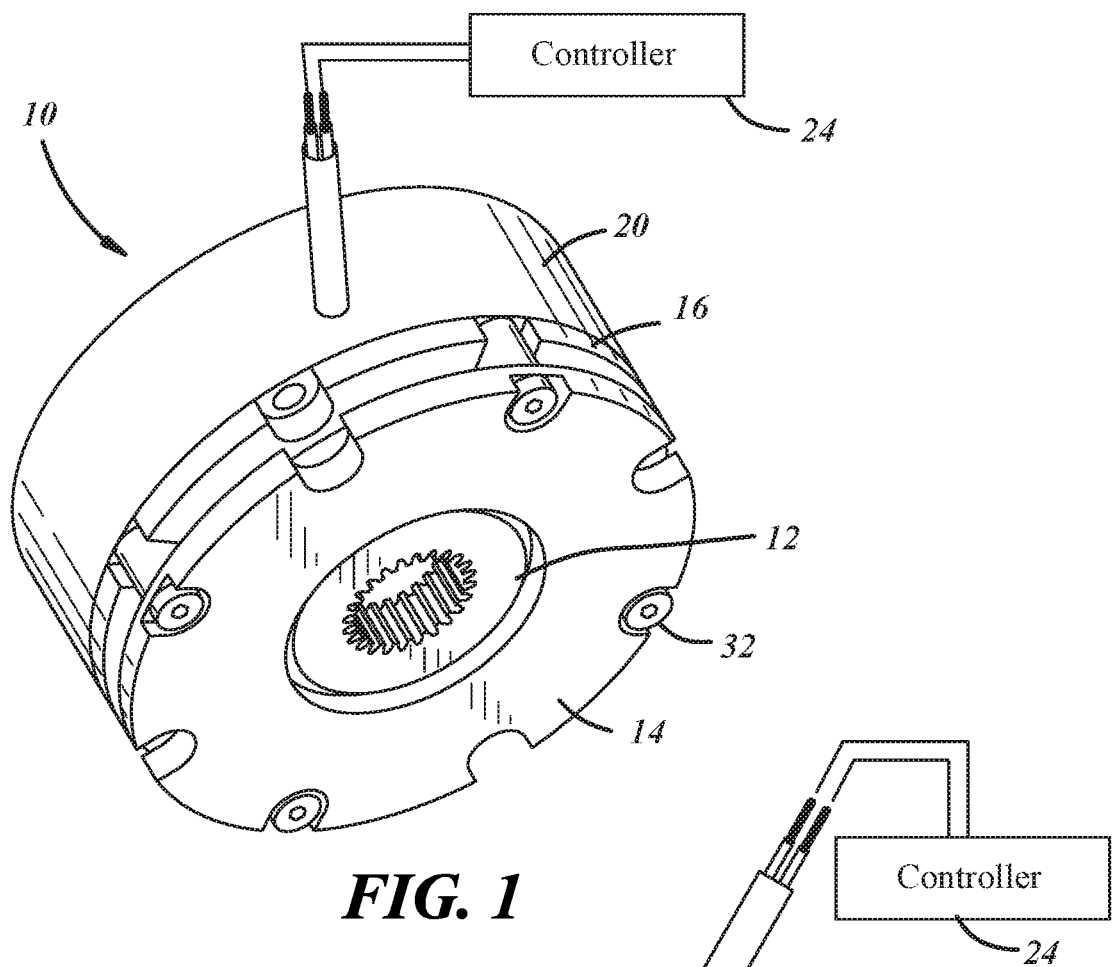
FIG. 1 is a perspective view of a brake in accordance with one embodiment of the present invention.
Figure 2:
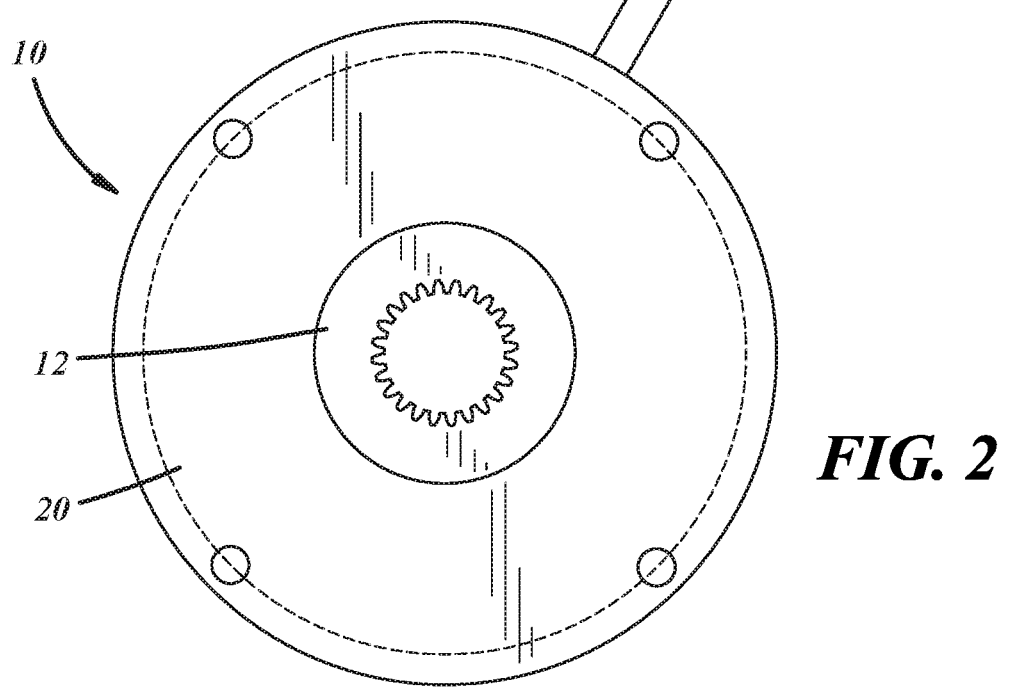
FIG. 2 is a rear view of the brake of FIG. 1.

Referring now to the drawings wherein like reference numerals are used to identify identical components in the various views, FIG. 1-4 illustrate a brake 10 in accordance with one embodiment of the invention. Brake 10 provides a braking torque to a rotating body such as a shaft, gear, pulley, blade, etc. in order to slow or halt rotation of the rotating body. It will be understood by those of ordinary skill in the art that brake 10 may be used in a wide variety of industrial and other applications requiring a brake. Brake 10 may include a friction plate 12, a pressure plate 14, an armature plate 16, means, such as springs 18, for biasing armature plate 16 in one direction, means, such as field shell 20 and conductor 22, for urging armature plate 16 in another direction, and a controller 24.

Friction plate 12 is provided to transmit a braking torque to a shaft or other rotating body. Friction plate 12 may be made from conventional metals or plastics and may be made by stamping, molding and/or machining. Referring to FIG. 4, friction plate 12 may be annular in shape and disposed about, and centered about, a rotational axis 26. Friction plate 12 is coupled to, and configured for rotation with, a shaft (not shown) about axis 26 and may be rotationally coupled to the shaft in a variety of ways that permit axial movement of friction plate 12 relative to the shaft to enable proper operation of brake 10 and account for wear, vibration, runout or thermal expansion. For example, the radially inner surface of friction plate 12 and the radially outer surface of the shaft may have complementary, torque transmitting, shapes such as splines (as shown in the illustrated embodiment), a key and keyway, single or double D-shape or hexagonal shape. Friction plate 12 includes friction surfaces on opposed sides 28, 30 configured to engage pressure plate 14 and armature plate 16, respectively, during engagement of brake 10.

Pressure plate 14 is configured to engage friction plate 12 during application of brake 10 to transmit a braking torque to friction plate 12. Pressure plate 14 provides a reaction surface against which armature plate 16 presses friction plate 12 during application of brake 10. Pressure plate 14 may be made from conventional metals or plastics and may be made from steel (including stainless steel) in some embodiments. Pressure plate 14 is disposed on side 28 of friction plate 12. Pressure plate 14 may further be disposed about axis 26. Pressure plate 14 is fixed against rotation and may be coupled to field shell 20 using a plurality of axially extending fasteners 32 such as bolts, pin, screws or the like.

Armature plate 16 is also configured to engage friction plate 12 during application of brake 10 to transmit a braking torque to friction plate 12. Armature plate 16 may be made from metals or metal alloys or other materials having relatively low magnetic reluctance such as iron or steel. In accordance with various embodiments, armature plate 16 is made from metal alloys having a relatively high carbon content such that that armature plate 16 has a relatively high remanence following exposure to electromagnetic fields. In accordance with certain embodiments, armature plate 16 is made from a material having a content of at least 0.35 percent by weight of carbon or a carbon equivalent (a "carbon equivalent" comprises a combination of carbon (C), manganese (Mn), chromium (Cr), molybdenum (Mo), vanadium (V), nickel (Ni) and copper (Cu) often represented by the formula CE=C+Mn/6+(Cr+Mo+V)/5+(Ni+Cu)/15). Armature plate 16 is disposed on side 30 of friction plate 12. Armature plate 16 may further be disposed about, and centered about, axis 26. Armature plate 16 is fixed against rotation, but is axially movable towards and away from friction plate 12 and pressure plate 14 to permit engagement and disengagement of brake 10. Armature plate 16 may include a plurality of bores extending through armature plate 16 or a plurality of recesses in the radially outer surface of armature plate 16 configured to permit fasteners 32 to pass through armature plate 16. In this manner, fasteners 32 limit or prevent rotation of armature plate 16 about axis 26, but armature plate 16 is permitted to move along axis 26.

Springs 18 provide a means for biasing armature plate 16 in one direction along axis 26 towards friction plate 12 and pressure plate 14 to engage brake 10. Springs 18 may be disposed between field shell 20 and armature plate 16 and exert a biasing force on armature plate 16 urging friction plate 12 towards pressure plate 14. It should be understood that brake 10 may include either a single annular spring 18 or a plurality of springs 18 disposed in an annular array about axis 26. In the latter case, springs 18 may be spaced equally circumferentially spaced about axis 26.

Field shell 20, together with conductor 22, provide a means for urging armature plate 16 in the opposite direction along axis 26 away from friction plate 12 and pressure plate 14 to disengage brake 10. Field shell 20 may also provide structural support and orient other components of brake 10 including pressure plate 14 and springs 18. Field shell 20 may be annular in shape and disposed about, and centered about axis 26 and may be disposed on a side of armature plate 16 opposite friction plate 12. Field shell 20 may be made from materials having a relatively low magnetic reluctance such as ferromagnetic materials. In accordance with various embodiments, field shell 20 is made from metal alloys having a relatively high carbon content such that that field shell 20 has a relatively high remanence following exposure to electromagnetic fields. In accordance with certain embodiments, field shell 20 is made from a material having a content of at least 0.35 percent by weight of carbon or a carbon equivalent. Field shell 20 may define a radially extending end wall 34 and axially extending, radially aligned, inner and outer walls 36, 38 that extend axially from end wall 34 towards armature plate 16. Inner wall 36 may define one or more closed bores 40 configured to receive one end of each spring 18. Outer wall 38 may also define one or more closed bores 42 configured to receive fasteners 32. Conductor 22 may comprise a conventional wound coil or similar conductor and is configured to be received within field shell 20 between walls 36, 38. Current supplied to conductor 22 creates or weakens an electromagnetic circuit that includes armature plate 16 and field shell 20 depending on the strength and polarity of the current and the current state of brake 10 as discussed in greater detail below. The electromagnetic circuit urges armature plate 16 towards field shell 20 and away from friction plate 12 against the biasing force of springs 18 to disengage brake 10.

Controller 24 is provided to control the delivery of current to conductor 22 and, therefore, the operation of brake 10. Controller 24 may comprise a programmable microprocessor or microcontroller or may comprise an application specific integrated circuit (ASIC). Controller 24 may include a central processing unit (CPU). Controller 24 may also include a memory and an input/output (I/O) interface through which controller 24 may receive a plurality of input signals and transmit a plurality of output signals. Controller 24 controls the delivery of current to conductor 22 from a power source (not shown) such as a battery or capacitor.

Controller 24 is configured to deliver short duration current pulses to conductor 22 in order to apply and release brake 10. Because of the configuration of brake 10, brake 10 operates as a bistable brake in which current pulses cause brake 10 to move between engaged and disengaged states and to remain in a given state after the pulse ends until the next current pulse is provided to conductor 22. When brake 10 is engaged (i.e., when armature plate 16 engages friction plate 12 and sandwiches friction plate 12 between armature plate 16 and pressure plate 14 under the biasing force exerted by springs 18), controller 24 may disengage brake 10 by delivering a current pulse of either polarity to conductor 22. The current pulse establishes an electromagnetic circuit including armature plate 16 and field shell 20. In particular, the current pulse generates a magnetomotive force in an amount equal to the number of turns (N) in the conductor 22 multiplied by the amount of current (I). The magnetomotive force generates a magnetic flux ($\phi$)) that traverses the air gap between the armature plate 16 and field shell 20 with the amount of flux ($\phi$)) depending on the magnetic reluctance (R) in the electromagnetic circuit. The flux ($\phi$)) in the electromagnetic circuit creates an attractive force (F) between the armature plate 16 and field shell 20 opposing the biasing force of springs 18 and that is a combination of forces at the inner and outer poles formed by walls 36, 38 of field shell 20: $F=\phi^2/(\text{area of outer pole})+\phi^2/(\text{area of inner pole})$. The amount of current (I) supplied must be sufficient to generate an attractive force (F) greater than the biasing force of spring 18 in order to urge armature plate 16 in an axial direction away from friction plate 12 and towards field shell 20 to disengage brake 10.

In accordance with the present teachings, brake 10 is configured to maintain an attractive force (F) that exceeds the biasing force of spring 18 even after the current pulse is terminated. As discussed above, at least one of armature plate 16 and field shell 20 may be made from a material having a relatively high carbon content. As a result, the armature plate 16 and field shell 20 have a relatively high remanence that continues to exist even after the current pulse ends and current is no longer provide to conductor 22. Due to this remanence, a magnetic circuit among armature plate 16 and field shell 20 is maintained after termination of the current pulse and brake 10 remains in a disengaged or released state. In one embodiment, at least one of armature plate 16 and field shell 20 has a content of at least 0.35 percent by weight of carbon or a carbon equivalent so as to have a relatively high remanence. The exact material composition of armature plate 16 and/or field shell 20 may vary, however, based on other factors that influence the amount of attractive force between armature plate 16 and field shell 20 such as the size of the air gap between armature plate 16 and field shell 20 when brake 10 is disengaged and the area of the poles formed by the inner walls 36, 38 of field shell 20. Further, the material composition may be chosen in consideration with other factors that influence residual magnetism including annealing, mechanical stresses (e.g., coining) and heat treatment of materials. In general, the material for armature plate 16 and/or field shell 20 is selected so as to produce a residual attractive force between armature plate 16 and/or field shell 20 that exceeds the biasing force of spring 16 when considering these other factors.

When it is desired to reengage or reapply brake 10, controller 24 may deliver another current pulse to conductor 22. The current pulse used to engage brake 10 has a polarity that is opposite the polarity of the pulse used to disengage brake 10. The current pulse again generates a magnetomotive force in an amount equal to the number of turns (N) in the conductor 22 multiplied by the amount of current (I), but this magnetomotive force operates in a direction opposite the force generated by the current pulse used to disengage brake 10. This coercive magnetomotive force reduces the residual magnetic flux ($\phi$) traversing the air gap between the armature plate 16 and field shell 20. As a result, the current pulse weakens the magnetic circuit among armature plate 16 and field shell 20 thereby allowing springs 18 to move armature plate 16 along axis 26 away from field shell 20 and towards friction plate 12 to reengage brake 10. Because the biasing force of springs 18 moves armature plate 16 during engagement of brake 10, the current pulse used to engage brake 10 may have a magnitude that is less than the magnitude of the current pulsed used to disengage brake 10 (in which the force exerted by springs 18 must be overcome). Further, the amount of current required to reengage or reapply brake 10 may be minimized by considering the size of the air gap between armature plate 16 and field shell 20. In particular, the existence of the air gap also opposes the residual attractive force between armature plate 16 and field shell 20. In a graph of a conventional demagnetization curve, an air gap line can be plotted in the second quadrant of the graph from the origin and with a slope equal to the length of the air gap divided by the area of the air gap. The intersection of the line and the demagnetization curve identifies the residual magnetic flux remaining when no current is provided to conductor 22. From this point, one can determine the amount of current required to generate a coercive magnetomotive force that is sufficient, when combined with the impact of the air gap, to overcome the residua attractive force between armature plate 16 and field shell 20.

As described above, generation of current pulses by controller 24 is used to move brake 10 between a (fully) engaged position and a (fully) disengaged position. In some embodiments, however, it may be desirable to apply a partial braking torque to control the rate of motion in a rotating body. In these embodiments, controller 24 may be further configured to generate current pulses of alternating polarity at a relatively high frequency to produce a braking torque that is less than the torque provided by springs 18 alone. Controller 24 may generate these pulses in response to a set of programming instructions (i.e. software) stored in a memory, in response to sensor feedback (e.g., the speed of the rotating body, or position of armature plate 16 along axis 26) and/or in response to user commands entered through a conventional user interface.

A brake 10 in accordance with the present teachings is advantageous relative to conventional brakes. In particular, the inventive brake 10 provides a bistable brake in which the brake 10 may remain in engaged and disengaged states without a continuous current supply thereby limiting power consumption and heat. Further, the brake 10 avoids the use of permanent magnets thereby reducing the cost and complexity of the brake.

While the invention has been shown and described with reference to one or more particular embodiments thereof, it will be understood by those of skill in the art that various changes and modifications can be made without departing from the spirit and scope of the invention.

What is claimed is:

1. A brake, comprising:
a friction plate configured for coupling to a shaft for rotation with the shaft about an axis of rotation;
a pressure plate disposed about the axis on a first side of the friction plate and fixed against rotation;
an armature plate disposed about the axis on a second side of the friction plate;
a field shell disposed about the axis on an opposite side of the armature plate relative to the friction plate;
a spring biasing the armature plate in a first axial direction towards the friction plate and away from the field shell to engage the brake; and,
a conductor disposed within the field shell
wherein delivery of a first current pulse having a first polarity to the conductor when the brake is engaged establishes an electromagnetic circuit including the armature plate and the field shell that urges the armature plate in a second axial direction away from the friction plate and towards the field shell to disengage the brake, a magnetic circuit including the armature plate and the field shell is maintained after termination of the first current pulse due to a remanence in at least one of the armature plate and the field shell, the magnetic circuit generating an attractive force greater than a biasing force of the spring, and delivery of a second current pulse having a second polarity opposite the first polarity to the conductor when the brake is disengaged weakens the magnetic circuit thereby allowing the spring to move the armature plate in the first axial direction away from the field shell and towards the friction plate to engage the brake.

2. The brake of claim 1 wherein a magnitude of the second current pulse is less than a magnitude of the first current pulse.

3. The brake of claim 1 wherein the at least one of the armature plate and the field shell has a content of at least 0.35 percent by weight of carbon or a carbon equivalent.

4. The brake of claim 3 wherein both of the armature plate and the field shell have a content of at least 0.35 percent by weight of carbon or a carbon equivalent.

5. The brake of claim 1 wherein said pressure plate is coupled to said field shell.

6. The brake of claim 1 wherein said spring is disposed between said field shell and said armature plate.

7. A brake, comprising:
a friction plate configured for coupling to a shaft for rotation with the shaft about an axis of rotation;
a pressure plate disposed about the axis on a first side of the friction plate and fixed against rotation;
an armature plate disposed about the axis on a second side of the friction plate;
a field shell disposed about the axis on an opposite side of the armature plate relative to the friction plate;
a spring biasing the armature plate in a first axial direction towards the friction plate and away from the field shell to engage the brake; and,
a conductor disposed within the field shell
a controller configured to deliver a first current pulse to the conductor when disengaging the brake, the first current pulse having a first polarity and configured to establish an electromagnetic circuit including the armature plate and the field shell that urges the armature plate in a second axial direction away from the friction plate and towards the field shell, a magnetic circuit including the armature plate and the field shell maintained after termination of the first current pulse due to a remanence in at least one of the armature plate and the field shell, the magnetic circuit generating an attractive force greater than a biasing force of the spring; and,
deliver a second current pulse to the conductor when engaging the brake, the second current pulse having a second polarity opposite the first polarity and configured to weaken the magnetic circuit thereby allowing the spring to move the armature plate in the first axial direction away from the field shell and towards the friction plate.

8. The brake of claim 7 wherein a magnitude of the second current pulse is less than a magnitude of the first current pulse.

9. The brake of claim 7 wherein the at least one of the armature plate and the field shell has a content of at least 0.35 percent by weight of carbon or a carbon equivalent.

10. The brake of claim 9 wherein both of the armature plate and the field shell have a content of at least 0.35 percent by weight of carbon or a carbon equivalent.

11. The brake of claim 7 wherein said pressure plate is coupled to said field shell.

12. The brake of claim 7 wherein said spring is disposed between said field shell and said armature plate.

13. A brake, comprising:
a friction plate configured for coupling to a shaft for rotation with the shaft about an axis of rotation;
a pressure plate disposed about the axis on a first side of the friction plate and fixed against rotation;
an armature plate disposed about the axis on a second side of the friction plate;
a field shell disposed about the axis on an opposite side of the armature plate relative to the friction plate;
a spring biasing the armature plate in a first axial direction towards the friction plate and away from the field shell to engage the brake; and,
a conductor disposed within the field shell
wherein at least one of the armature plate and the field shell has a remanence that generates, after the brake is disengaged by providing a current pulse to the conductor and following termination of the current pulse, an attractive force between the armature plate and the field shell greater than a biasing force of the spring.

14. The brake of claim 13 wherein the at least one of the armature plate and the field shell has a content of at least 0.35 percent by weight of carbon or a carbon equivalent.

15. The brake of claim 13 wherein both of the armature plate and the field shell have a content of at least 0.35 percent by weight of carbon or a carbon equivalent.

* * * * *